United States Patent
Glenn, III et al.

(10) Patent No.: US 11,707,072 B2
(45) Date of Patent: *Jul. 25, 2023

(54) FOOD PRODUCTS AND SYSTEMS AND METHODS OF MAKING SAME

(71) Applicant: Land O'Lakes, Inc., Arden Hills, MN (US)

(72) Inventors: Thomas Alexander Glenn, III, Shoreview, MN (US); Clint Garoutte, Elk River, MN (US); Kang Hu, Shoreview, MN (US); Jason Thompson, Robbinsdale, MN (US); Orlando Maldonado, Minneapolis, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,919

(22) Filed: Nov. 22, 2019

(65) Prior Publication Data

US 2020/0085073 A1    Mar. 19, 2020

Related U.S. Application Data

(63) Continuation of application No. 15/819,188, filed on Nov. 21, 2017, now Pat. No. 10,517,312, which is a continuation of application No. 14/601,865, filed on Jan. 21, 2015, now Pat. No. 9,826,751.

(60) Provisional application No. 61/929,844, filed on Jan. 21, 2014.

(51) Int. Cl.
*A23C 9/142* (2006.01)
*A23C 19/05* (2006.01)
*A23C 19/028* (2006.01)

(52) U.S. Cl.
CPC .......... *A23C 9/1422* (2013.01); *A23C 19/028* (2013.01); *A23C 19/0285* (2013.01); *A23C 19/051* (2013.01)

(58) Field of Classification Search
CPC . A23C 9/1422; A23C 19/028; A23C 19/0285; A23C 19/051
USPC ..... 426/491, 490, 580, 582, 583, 34, 36, 39, 426/40, 42
See application file for complete search history.

(56) References Cited

U.S. PATENT DOCUMENTS

| | | | |
|---|---|---|---|
| 4,205,090 A | 5/1980 | Maubois et al. | |
| 4,401,679 A | 8/1983 | Rubin et al. | |
| 4,568,528 A | 2/1986 | Cheung | |
| 5,165,945 A | 11/1992 | Yee et al. | |
| 5,262,183 A | 11/1993 | Moran et al. | |
| 5,547,691 A | 8/1996 | Kjaer et al. | |
| 6,183,805 B1 | 2/2001 | Moran et al. | |
| 8,840,947 B2 | 9/2014 | Scott et al. | |
| 9,826,751 B2 * | 11/2017 | Glenn, III | ............ A23C 19/051 |
| 10,517,312 B2 * | 12/2019 | Glenn, III | .......... A23C 19/0285 |
| 2003/0077357 A1 | 4/2003 | Rizvi et al. | |
| 2004/0009261 A1 * | 1/2004 | Brody | .................. A23C 9/1209 |
| | | | 426/34 |
| 2006/0062873 A1 | 3/2006 | Yee et al. | |
| 2013/0022729 A1 | 1/2013 | Chinwalla et al. | |
| 2014/0017357 A1 | 1/2014 | Aaltonen et al. | |
| 2015/0064332 A1 | 3/2015 | Glenn et al. | |

FOREIGN PATENT DOCUMENTS

| | | |
|---|---|---|
| CA | 2287708 A1 | 4/2000 |
| EP | 2649884 A1 | 10/2013 |
| FI | 20115161 A | 8/2012 |
| FI | 123267 B | 1/2013 |
| WO | 03003846 A1 | 1/2003 |
| WO | 03069982 A1 | 8/2003 |
| WO | 2009059266 A1 | 5/2009 |
| WO | 2012060723 A1 | 5/2012 |
| WO | 2012110706 A1 | 8/2012 |

OTHER PUBLICATIONS

Ernstrom, C A. et al., "Cheese Base for Processing. A High Yield Product for Whole Milk by Ultrafiltration", J. Dairy Sci. vol. 63, 1980, pp. 228-234.
PCT, "International Search Report and Written Opinion", Application No. PCT/US2015/012241, dated Mar. 26, 2015, 8 pages.
Turgeon, S L., "Combined effects of microfiltration and ultrafiltration on the composition of skim milk retentate", Journal of Dairy Science, American Dairy Science Association; vol. 78. No. Supp. 1, 1995, pp. 128.
Van Dijk, H.J.M, "The properties of casein micelles—Changes in the state of the micellar calcium phosphate and their effects on other changes in the casein micelles", Netherlands Milk and Dairy Journal; vol. 44 No. 3-4, 1990, pp. 125-141.
Zehren, Vicent L. et al., "Process Cheese: Browning Discoloration, Changing Viscosity & Density Variation", Schreiber Foods, Inc., 1992, pp. 155-158 & 270.

\* cited by examiner

*Primary Examiner* — Leslie A Wong
(74) *Attorney, Agent, or Firm* — Dorsey & Whitney LLP

(57) ABSTRACT

Food products and systems and methods for their production involve microfiltration ("MF") of fluid skim to form a MF retentate, combining the MF retentate with cream and subjecting the combination to ultrafiltration ("UF") to form a UF retentate. Prior to UF, the composition is formed of non-acidified components. Following UF, the UF retentate is acidified and forms a food product including a high solids content. The solids content may be further increased using evaporation. The resulting cheese or cheese base contains a lower whey protein ratio in a fat:casein:whey protein ratio compared to systems and methods that do not employ MF.

19 Claims, 9 Drawing Sheets

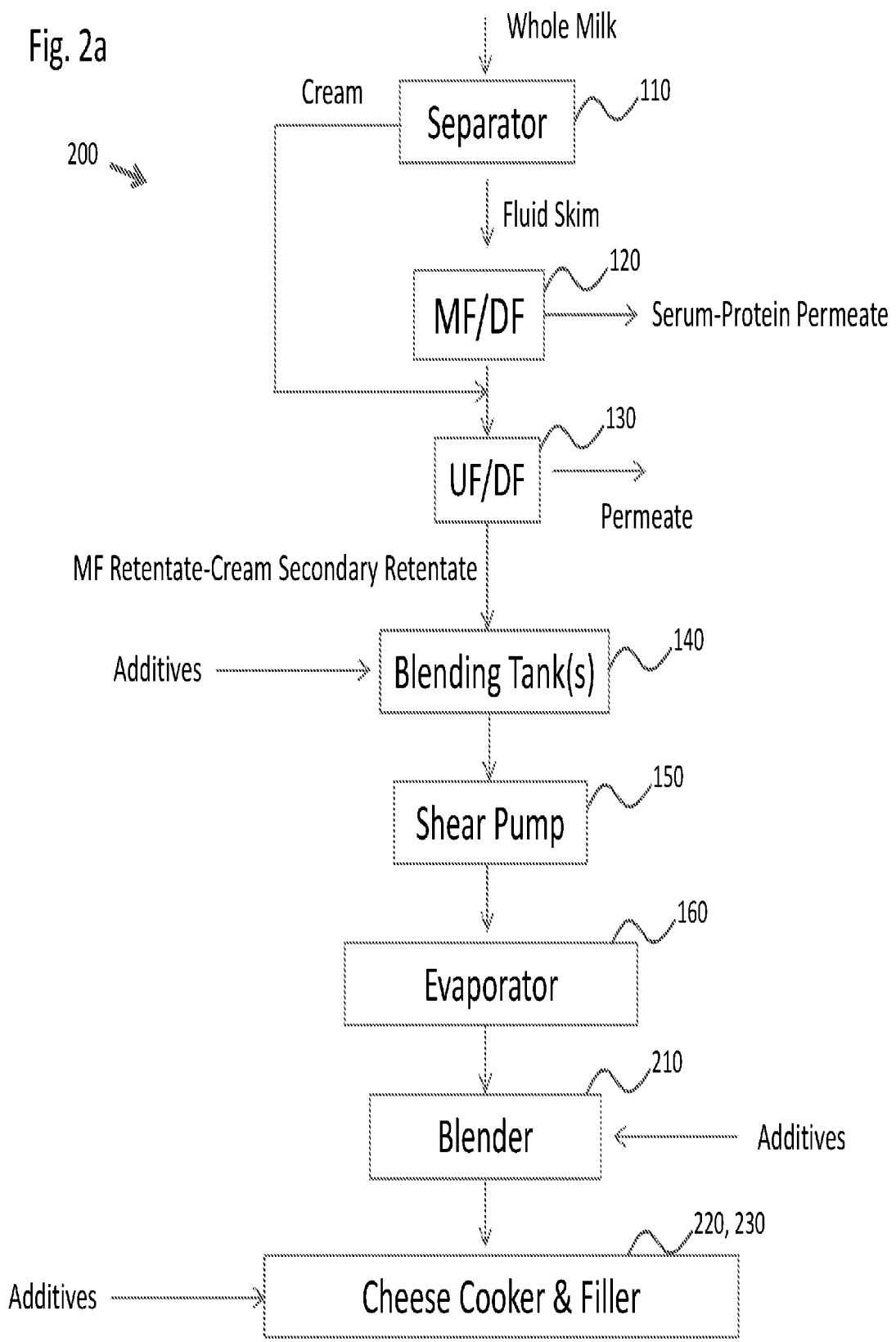

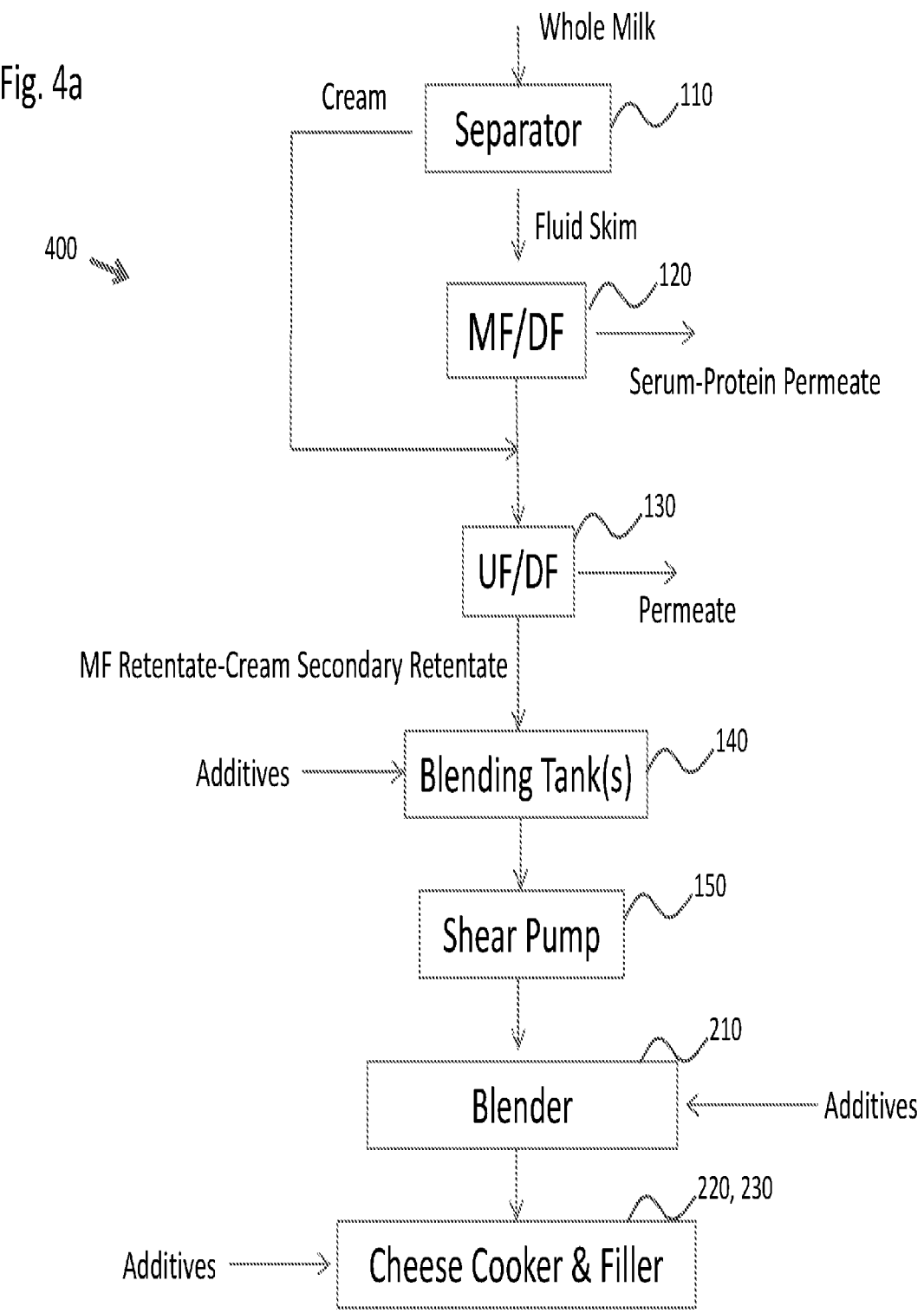

FOOD PRODUCTS AND SYSTEMS AND METHODS OF MAKING SAME

CROSS-REFERENCES TO RELATED APPLICATION

This application is a continuation of U.S. patent application Ser. No. 15/819,188 filed Nov. 21, 2017, now U.S. patent Ser. No. 10/517,312, which is a continuation of U.S. patent application Ser. No. 14/601,865 filed Jan. 21, 2015, issued as U.S. Pat. No. 9,826,751 on Nov. 28, 2017, which claims priority to U.S. Provisional Application No. 61/929,844 filed Jan. 21, 2014, the entire contents of which are incorporated herein by reference.

TECHNICAL FIELD

The present disclosure generally relates to food products, such as cheese or cheese base products, and systems and methods for their manufacture.

BACKGROUND

In prior cheese making processes, whole milk was typically subjected to natural cheese making processes and subsequently used as a component for making process cheese products. In other prior approaches, whole milk with added cream was concentrated using ultrafiltration and cultures and/or enzymes were added, followed by adjusting the moisture content. Use of ultrafiltration without microfiltration resulted in retention of whey proteins, which can contribute to melt restriction and undesirable softening of process cheese products. In further prior approaches, cheese making processes involve acidification prior to ultrafiltration. However, the production of acidified precursors provide challenges to filtration and to controlling the pH of the final product.

SUMMARY

Implementations are directed to food products, such as cheese and cheese base products, and systems and methods for their production.

In one exemplary implementation, a method of forming a food product involves separation of whole milk into cream and skim milk followed by microfiltration ("MF") of the skim milk to form a MF retentate. Cream may then be added to the MF retentate, and the cream and MF retentate may be subjected to ultrafiltration ("UF") to form a UF retentate. Acidification of the UF retentate, may result in the food product.

In some implementations the MF retentate, the UF retentate or both may be subjected to diafiltration ("DF").

In some implementations, the cream from the whole milk in which the skim milk is derived is used in the UF step of the UF retentate.

In some implementations, the UF retentate may be subjected to blending, homogenization, evaporation, cooking and/or other processing steps.

Implementations provide methods for the production of a food product that involve separating whole milk into cream and skim milk; subjecting the separated skim milk to MF to remove at least a portion of whey protein from the skim milk to form a skim milk MF retentate; combining the separated cream with the skim milk MF retentate; subjecting the combined cream and skim milk MF retentate to UF to remove moisture and increase total solids thereby forming a UF retentate; and acidifying the UF retentate to form the food product. Prior to the step of acidifying, the cream, skim milk, skim milk MF retentate and UF retentate are non-acidified.

In some variations, the skim milk MF retentate may be subjected to diafiltration prior to the step of combining the separated cream with the skim milk MF retentate, where diafiltration removes lactose and whey/serum protein from the skim milk MF retentate. In addition or alternatively, the UF retentate may be subjected to diafiltration prior to the acidifying step, where diafiltration removes lactose from the UF retentate. In addition or alternatively, the acidified UF retentate may be blended with one or more additives such as dairy powders, milk fat, cultures and/or water, alone or in combination with salt and/or lactic acid. The food product may be cooked, and emulsifiers may be added to the food product during cooking. In addition or alternatively, the step of subjecting the separated skim milk to MF may involve MF of the separated skim milk that is not fat corrected, and the MF retentate may be combined with cream that has not been further processed and the combination subjected to UF. In addition or alternatively, the food product may be provided to one or more of a stuffer, a filler or a metal detector.

Methods for the production of a food product may involve subjecting skim milk to MF to remove at least a portion of whey protein from the skim milk to form a skim milk MF retentate; combining the cream with the skim milk MF retentate; subjecting the combined cream and skim milk MF retentate to UF to remove moisture and increase total solids thereby forming a UF retentate, where the UF retentate contains at least about 1 wt % salt; and maintaining a viscosity of the UF retentate below 1000 cP for at least 8 hours.

In some variations, the step of maintaining a viscosity of the UF retentate below 1000 cP is by circulating the UF retentate using one or more of pumping or sweeping. In addition or alternatively, after the step of maintaining, the viscosity of the UF retentate is adjusted to a selected viscosity, which may be through homogenization. In addition or alternatively, a portion of the MF retentate may be reserved prior to the step of combining; and the reserved portion of the MF retentate added to the UF retentate to form, thereby increasing moisture and protein in the UF retentate. In addition or alternatively, prior to the step of subjecting to UF, the combination of the cream and the skim milk MF retentate is non-acidified. In addition or alternatively, further comprising, prior to the step of combining, the MF retentate may be subjected to a second MF at a second temperature different from the first such that beta casein is removed, or the MF retentate is cooled to a temperature of about 40° F. to 60° F. and subjected to MF.

BRIEF DESCRIPTION OF THE DRAWINGS

FIGS. 1, 2a, 2b, 3, 4a, 4b and 5 illustrate exemplary food product production methods according to implementations of the present disclosure.

DETAILED DESCRIPTION OF THE EMBODIMENTS

Figure 1:
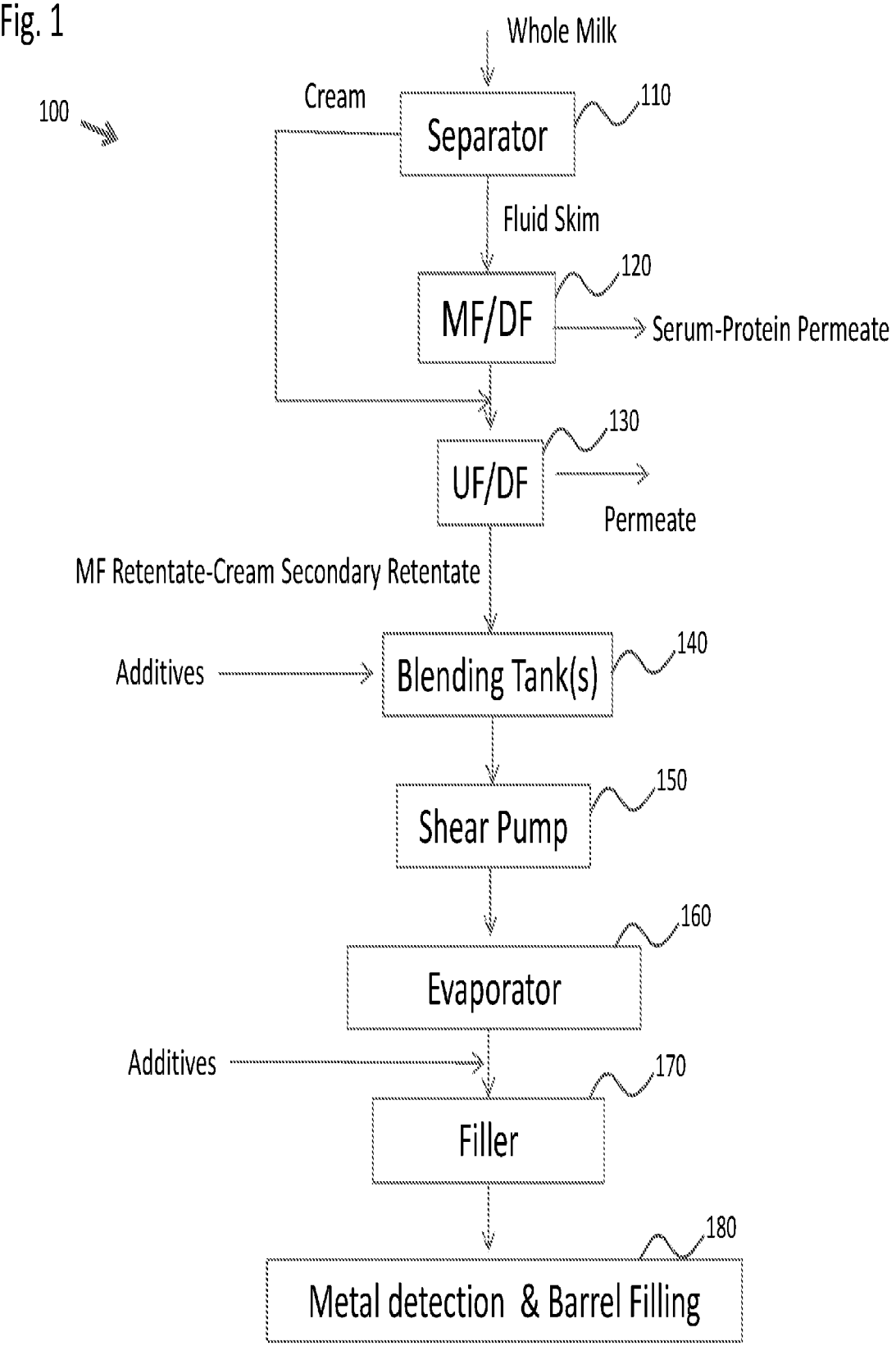

Overview:

Natural cheese, process cheese products, concentrates, and other food products may be produced according to the present disclosure. The processes may involve separation, microfiltration, and ultrafiltration of milk to form a concentrate, as well as acidification, shear, and evaporation of the milk concentrate. Filtration steps may take place prior to acidification. Processes may result in a food product such as a concentrate, a cheese and/or a cheese base with a high solids content, which may be produced in continuous or batch production processes with a reduced processing time, for instance, compared to the processing times of traditional cheese or process cheese processing times. Furthermore, the properties of the food product can be adjusted by in-line addition of components such as additives (e.g., salt, acidifiers (e.g., lactic acid), dairy powders, milk fat, water, protein (e.g., microfiltration retentate), sugar, cultures, enzymes and/or emulsifiers (e.g., citrate-based salts such as sodium citrate and potassium citrate and/or phosphate-based salts such as calcium phosphate and monosodium phosphate) and adjusting operation parameters.

According to implementations of the present disclosure, microfiltration ("MF") involves a physical separation process of serum protein (e.g., whey protein) from fluid skim, and it has been discovered that removal of this protein may provide food products such as natural and process cheeses with better texture and flavor compared to prior approaches due to these products containing a lower level of whey proteins obtained by removal through MF as opposed to denatured whey protein being present, or whey protein that inherently displaces casein protein, or both, remaining in the end product. To illustrate, in prior approaches, some alternate cheese making processes used ultrafiltration ("UF") as a filtration method in order to concentrate milk, and this is a process that retains all proteins, including whey proteins, as well as fat. Consequently, the ratio among fat:casein:whey protein is the same as that in milk. According to the present disclosure, by using MF, a portion of the serum proteins (or whey) are removed in the permeate stream, and with less serum proteins (e.g., whey), subsequent UF of the MF retentate and cream results in a UF retentate with a lower whey protein ratio in fat:casein:whey protein, which may improve product texture and flavor. In addition, the whey protein may be collected in the MF permeate in a more native state with improved functional properties. In particular, traditionally, whey proteins are obtained by a cheese-whey process and whey proteins are less native due to pH/culture treatment. Additionally residual fat and oxidative products can remain in the whey via the cheese-whey process. Consequently, the separation of serum protein in their native form provides benefits in that the serum protein in the MF permeate has improved functional properties, such as water-binding, cleaner flavor and solubility.

DETAILED DESCRIPTION OF THE FIGURES

As illustrated in the system 100 of FIG. 1, cream is separated from whole milk in a separator 110 and the skim milk is fed to a MF unit for initial concentration. The MF of the fluid skim may remove serum proteins, lactose, and minerals in a serum protein enriched/fractionated MF permeate stream. The initial concentrating of the fluid skim may additionally involve one or more diafiltration ("DF") steps based on the desired level of extraction of the serum protein and lactose. For instance, a portion of the serum protein and lactose contained in the skim milk or MF retentate may be washed out of solution while retaining other components of the skim milk or MF retentate. The number of DF steps may be dependent upon the desired properties of the MF retentate and the final product. The retentate of MF and optional DF steps may include fat, and a portion of the initial protein, lactose, mineral and moisture content.

The retentate from MF and the optional DF steps ("MF/DF retentate") 120 may be combined with cream, and the combination of the MF/DF retentate and cream may be concentrated by ultrafiltration ("UF") to reach a high total solids content. UF may remove moisture and lactose from the composition as permeate. Additional DF steps may remove lactose. The retentate stream of the UF and optional DF steps ("UF/DF retentate") 130 may be the MF retentate and cream as a secondary retentate, and may be comprised of fat, and a portion of the initial protein, lactose, mineral and moisture content.

The UF/DF retentate may be blended with additives such as salt and lactic acid to adjust, for example, texture and pH using one or more blending tanks 140. The blended UF/DF retentate may be homogenized through inline shearing, such as using a shear pump 150. The optionally blended and homogenized UF/DF retentate may be fed to an evaporator 160 such as a wiped film evaporator to adjust the moisture content of the retentate and form a food product (e.g., cheese/cheese base). Thereafter, optional additives such as cultures or enzymes may be added to the food product and filled into barrels or boxes using a filling station 170 and/or a barrel filling system 180. In addition or alternatively, additives may be introduced prior to feeding the UF/DF retentate to the evaporator 160, and for instance, may be introduced in liquid or powder form.

According to another exemplary embodiment, a food product may be produced according to the system 200 of FIG. 2a. Aspects of system 200 that are the same as system 100 include numbering corresponding to FIG. 1. According to this embodiment, a high total solids stream may result from concentration steps of MF and UF, with optional DF steps for each of MF and UF according to steps 110-130. As shown in FIG. 2a, salt and lactic acid may be added to the UF/DF retentate (e.g., the MF retentate-cream secondary retentate) in one or more blending tanks 140. Other additives may additionally or alternatively be added to the blending tanks 140. For instance, cultures may be added to the UF/DF retentate for culturing the composition prior to further processing. After blending, the UF/DF retentate may be homogenized within a shear pump 150. After homogenization, the UF/DF retentate may be subjected to evaporation 160 for further concentration through moisture removal. The moisture-adjusted UF/DF retentate may form a concentrate that may be blended in a blender 210 with various additives such as dairy powders, milk fat, cultures, emulsifiers (e.g., citrate-based salts such as sodium citrate and potassium citrate) and water and be provided to a cooker 220 where additives such as emulsifiers may be added, and the cooked food product may be sent to a filler 230 for packaging. In this embodiment, a straight-to-blender cooking process may eliminate the need to fill the mixture into barrels and hold prior to the further processing such as cooking.

Figure 2B:
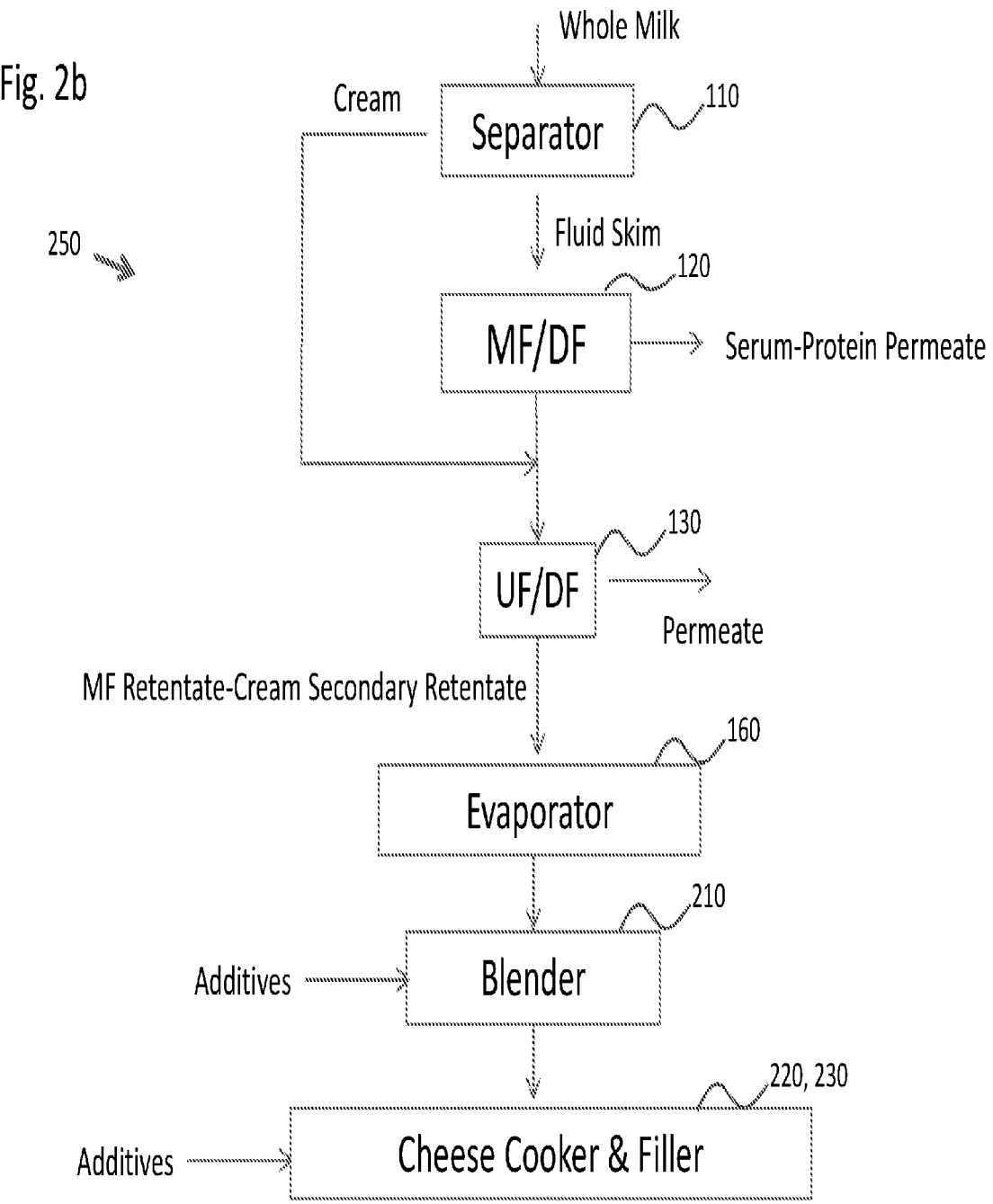

FIG. 2b provides another exemplary embodiment of a system 250 for production of a food product. The UF/DF retentate may be produced with a high total solid stream as described in connection with the system and operations of steps 110-130 in FIG. 1, and the UF/DF retentate may be concentrated using an evaporator 160 to form a food product. According to FIG. 2b, the product from the evaporator 160 may be blended in a blender 210 as in FIG. 2a, but in this embodiment, the UF/DF retentate is blended additionally with salt and lactic acid, in combination with various other additives (e.g., dairy powders, milk fat, emulsifiers and/or water) described in connection with FIG. 2a, and the mixture may be sent to a cooker 220 where additives such as emulsifying salts may be added to the mixture. Cooking the mixture may form a food product, which may be sent to a filler 230 for packaging. In addition to eliminating the need to fill the product (e.g., cheese base) into barrels and hold prior to further processing, the embodiment of FIG. 2b may eliminate the need for blending tanks 140 for blending the salt and lactic acid prior to evaporation.

Figure 3:
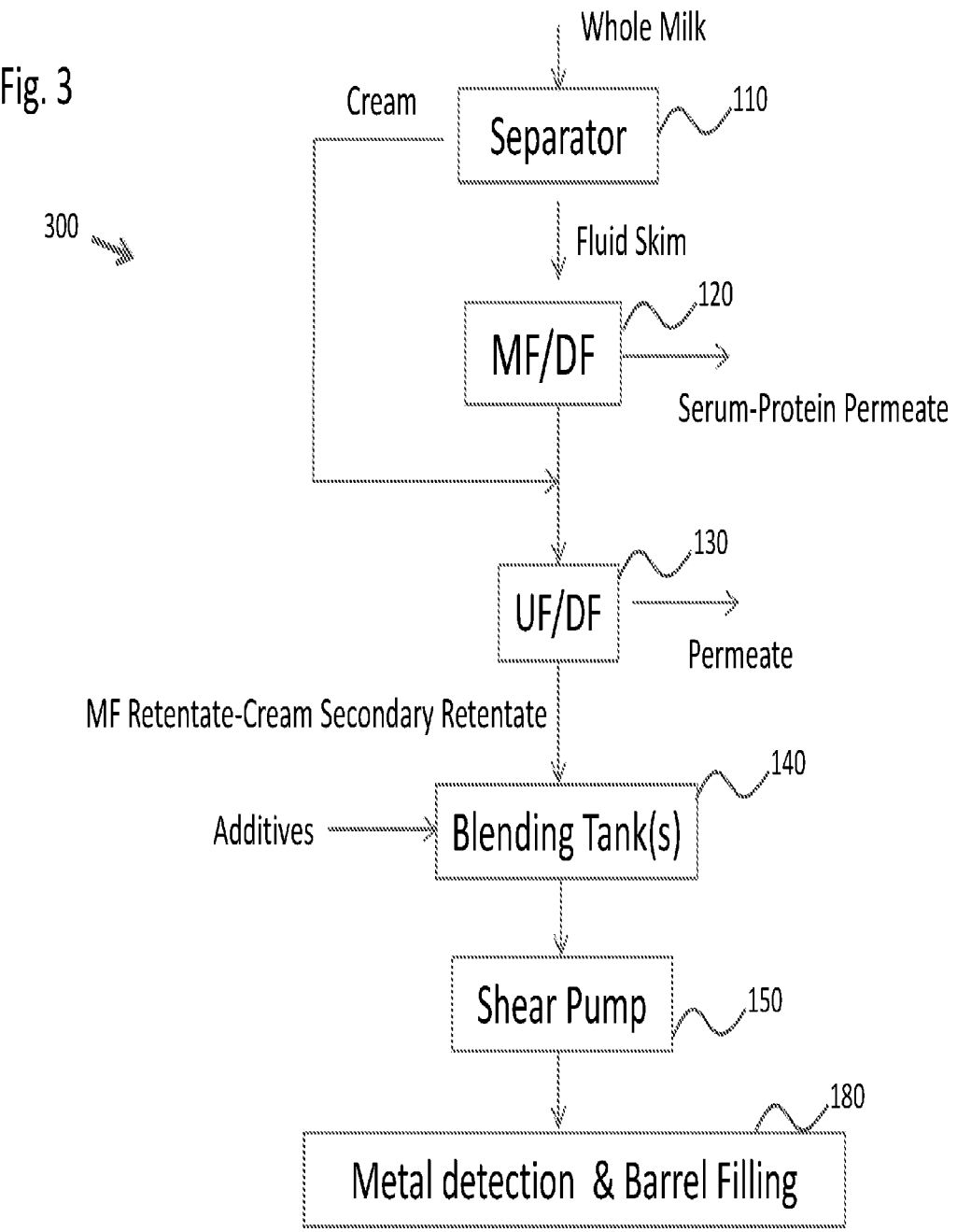

FIG. 3 illustrates yet another implementation for producing a food product according to the present disclosure. In system 300 of FIG. 3, and similar to FIG. 1, a high total solid stream of a UF/DF retentate may be produced and then provided to one or more blending tanks where components such as salt, lactic acid and other additives may be blended with the UF/DF retentate according to steps 110-140. The mixture may be homogenized to form a homogenous food product using a shear pump 150. The food product may be filled into barrels or boxes using a barrel filling station 180 and cooled for further processing or cured and then cooled prior to further processing. For example, curing may provide optional cultures or enzymes a suitable time/temperature combination to yield enhanced flavor and/or texture characteristics. The embodiment of FIG. 3 may eliminate the need for moisture adjustment through evaporation using an evaporator, such as evaporator 160.

FIG. 4a is another approach to producing a food product according to the present disclosure. In the system 400 of FIG. 4a, a UF/DF retentate may be provided according to steps 110-130, and the UF/DF retentate may be blended (e.g., via blending tank(s) 140) and sheared (e.g., via shear pump 150) as described in connection with FIG. 1. Blending in one or more blending tanks 140 may involve mixing the UF/DF retentate with additives such as salt and/or lactic acid, and the blended UF/DF retentate may be homogenized. The homogenized UF/DF retentate may be transported to a blender 210 where it may be mixed with additives such as dairy powder, milk fat, emulsifiers and water, and the combined mixture may be sent to a cooker 220, where additives such as emulsifying salts may be added and the mixture then converted to a process food product (e.g., process cheese). The process food product may be sent to a filler 230 for packaging. In addition to eliminating the need for moisture adjustment through evaporation as in the method of FIG. 3, the embodiment of FIG. 4a may eliminate the need to fill the mixture into barrels and hold prior to the further processing such as cooking.

Figure 4B:
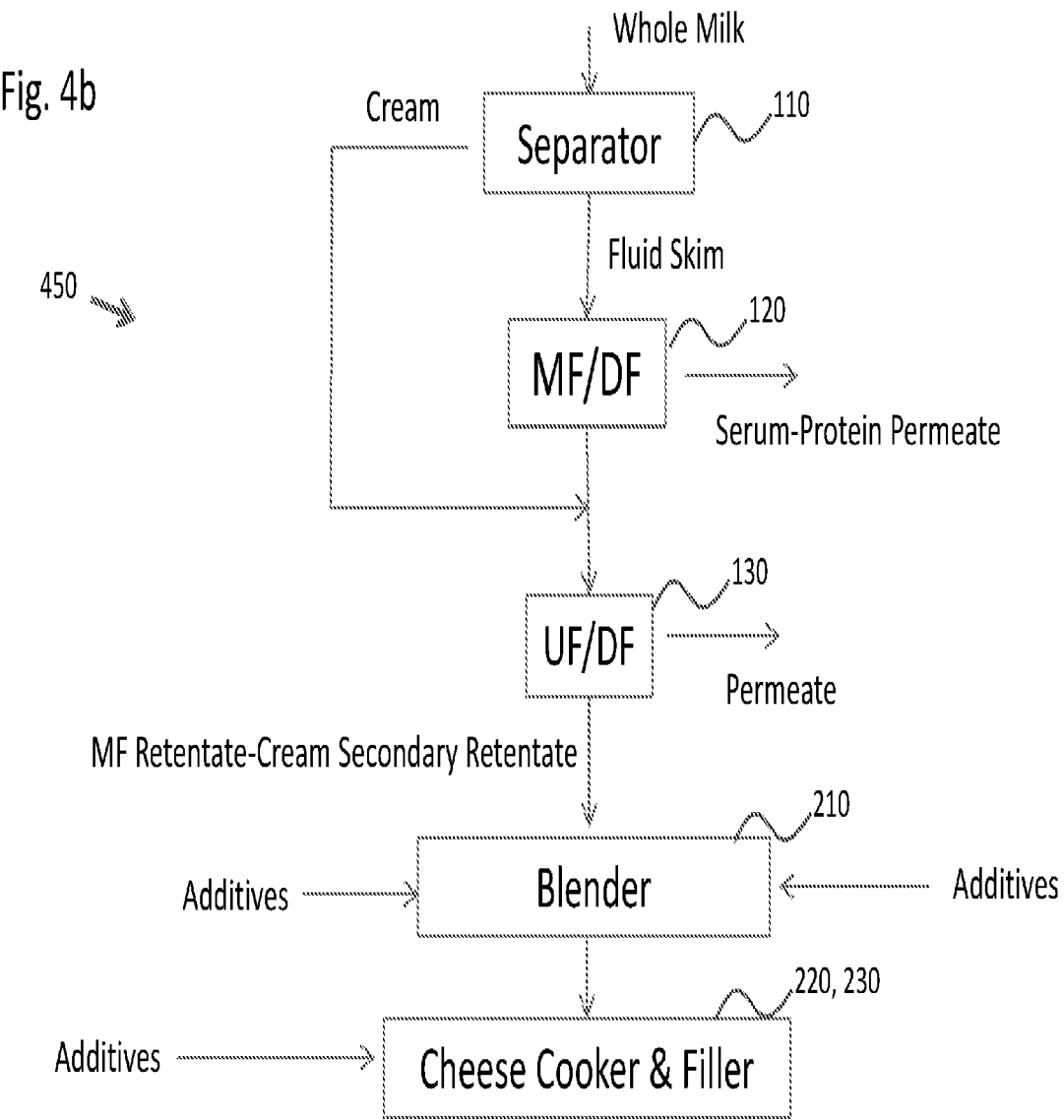

FIG. 4b is yet another approach to producing a food product according to the present disclosure. In system 450 of FIG. 4b, a UF/DF retentate may be provided according to the method described in connection with system 100 of FIG. 1, and the UF/DF retentate may be blended in a blender 210 with components such as salt, lactic acid, emulsifiers and other additives. This combined mixture may then be sent to a cooker 220 where emulsifying salts may be added to the mixture to produce a process food product, which may be sent to a filler 230 for packaging. In FIG. 4b, a substantial portion of the additives used in forming the food product may be added to the UF/DF retentate in the blender 210. This may remove the need for use of blending tanks 140 and shear pumps 150. However, in some implementations, homogenization may take place in any of a blender 210, an optional blending tank 140 or shear pump 150. In addition or alternatively, a blending tank 140 or a shear pump 150 may replace the blender 210 in the embodiment of FIG. 4b.

In the foregoing embodiments, the compositions leading to the formation of the UF/DF retentate are non-acidified compositions, e.g., non-acidified cream, skim milk, MF retentate, DF retentate and UF retentate. It has been discovered that forming the UF/DF retentate with a high solids content prior to acidification prevents damaging the functionality of MF permeate used to develop certain food products. In addition, forming the UF/DF retentate without acidified components does not change the pH of UF permeate, consequently preventing damage of its functionality to develop certain food products via eliminating altogether the acidulants entering these product streams. In addition, forming the UF/DF retentate without acidified components prevents membrane fouling that might otherwise occur due to formation of a "salt bridge" between soluble calcium, released by lowering pH, and membranes. Further, the non-acidified UF/DF retentate prevents membrane fouling due to the precipitation of protein and formation of curd, which occurs at lower pH. Non-acidified compositions resulting in the UF/DF retentate avoids the change of ratio of calcium in soluble form vs. colloidal form, which affects the texture of food products. Further still, this allows an accurate adjustment of pH levels in the final food products.

Furthermore, in the foregoing embodiments, the composition subjected to MF is fluid skim, which is the product of separating cream from whole milk. The fluid skim may not be processed further prior to MF. For example, the fluid skim may not be fat corrected prior to MF. The MF retentate may be fluid skim with a portion of the serum protein, lactose and minerals removed.

Moreover, the MF retentate may be combined with the cream derived from the whole milk from which the fluid skim was derived, and the cream may not be subjected to further processing between the separation and UF steps. Thus, the composition subjected to UF may be fluid skim with a portion of the serum protein removed and cream. Lactose from the fluid skim may additionally be removed in the optional DF steps associated with MF, e.g., preceding optional DF steps associated with UF. Because cream retains substantially all of the fat and a portion of the protein from the whole milk and is added to the MF retentate containing a portion of its original protein, the resulting product contains a lower level of whey proteins and does not exhibit the soft texture and off-flavor defects commonly associated with the presence of whey proteins in cheese. Moreover, due to the retention of substantially all of the fat and a portion of the whey protein, the filtration and optional evaporation steps may yield a high solids content product, and thus the compositions subjected to filtration and evaporation may not require fat correction. Further, by reserving cream for UF, fouling of the MF system by cream is avoided.

Implementations of the present disclosure provide several benefits over prior approaches. As described herein, the MF product having serum proteins removed may not exhibit the soft texture and off-flavor commonly associated with the presence of certain proteins in cheese. In addition, the addition of cream to the MF retentate before UF allows for further removal of moisture from the MF retentate. Further, UF following the combination of cream with the MF retentate may enable lactose removal from cream, which may yield a product with a lower lactose content. Further still, in certain implementations, the combination of salt and lactic acid to the UF/DF retentate may facilitate further moisture removal during evaporation. In-line addition of salt and acidification before shearing may reduce processing time and lower operational cost. Shearing the UF/DF retentate after acidification and the addition of salt may additionally facilitate reduced production times because the sheared UF/DF acidified and salted retentate has a reduced gel pH and ionic strength buffer capability and increased diffusion rate, which makes the intermediate product ready for cooking, for example, in a cooker. In additional or alternative implementations, the use of shearing, the addition of salt and acidification allow for a more homogenous material to be fed to the evaporator.

In implementations of use, the food product of the present disclosure may be natural, process or enzyme modified cheeses and may be used in flavored cheese powders, process cheese products, as a dairy base for high protein puddings, and so on.

Figure 5:
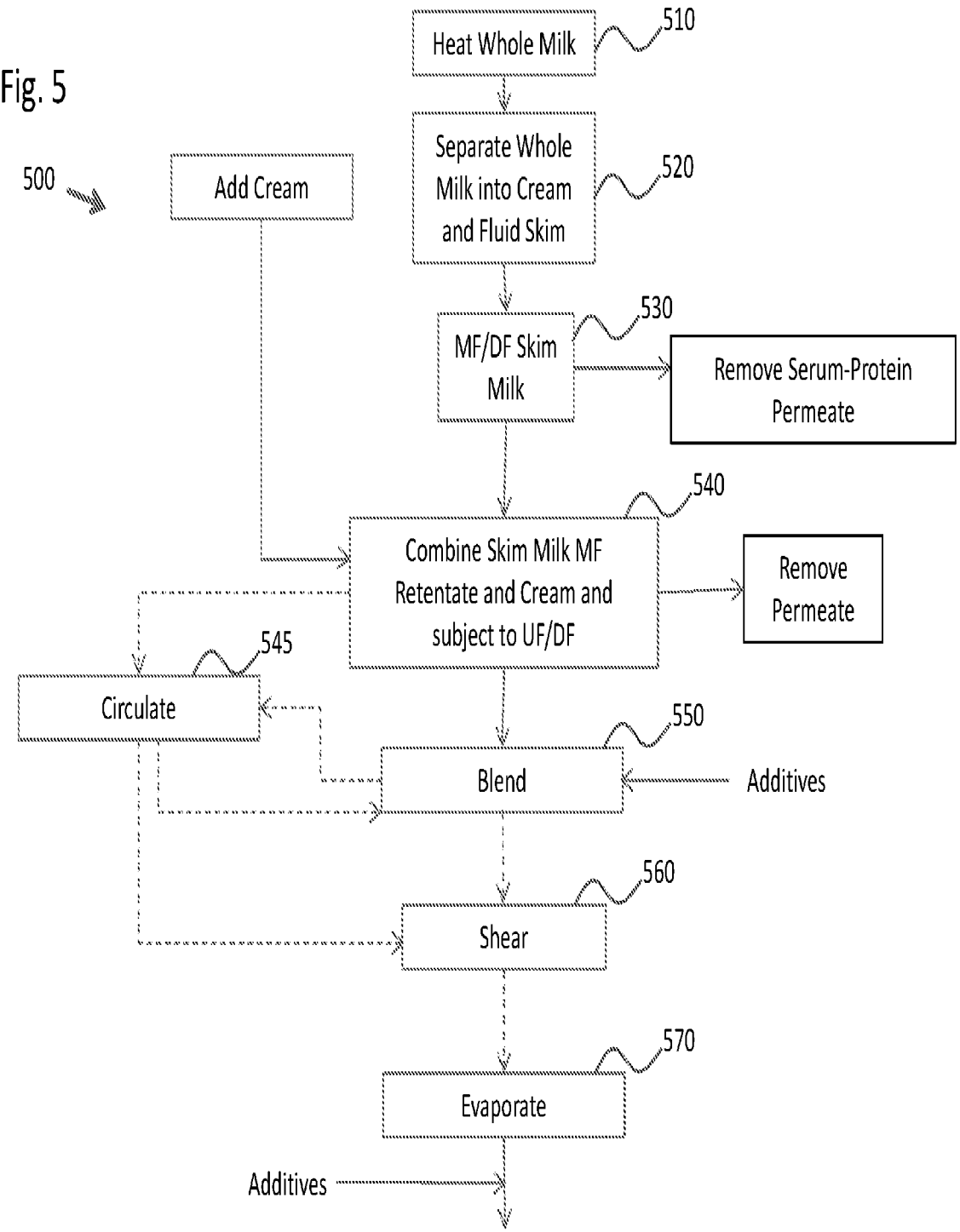

In another exemplary embodiment, and with reference to the method 500 of FIG. 5, whole milk may be heat-treated to about 140° F. at step 510 prior to separation of the whole milk into cream and skim milk at step 520. During separation, the skim milk stream outlet may have a pressure of about 70 PSI while the cream outlet may have a pressure of about 102 PSI (while adjusting back pressure). The separation ratio of cream vs. skim milk by weight may be about 9%, i.e., about 9% wt % of the whole milk is separated into cream, while about 91% wt % of the whole milk is separated into skim milk. Separation may occur at temperatures of about 130° F. to about 140° F. The separated skim milk and cream may be transferred in a continuous manner for further processing, e.g., during continuous production, or can be reserved, such as for batch operations. In batch operations, the skim milk and/or cream may be stored and cooled to temperatures below 40° F., e.g., about 35° F. to 40° F. Exemplary compositions of cream, skim milk, MF retentate, MF retentate and cream (Blend), and UF retentate streams that may be produced according to method 500 are provided in Table 1.

TABLE 1

Composition of streams in method 500

| Composition, wt % | Cream | Skim milk | MFR | MFR/ Cream Blend | UFR | Food Product |
|---|---|---|---|---|---|---|
| Total solid | 50 | 9.19 | 10.3 | 16.9 | 41.6 | 65.0 |
| Non-protein Nitrogen | 0.1 | 0.18 | 0.14 | 0.1 | N/A | N/A |
| Total protein | 1.93 | 3.41 | 7.2 | 6.14 | 14.2 | 22.2 |
| Casein | 1.48 | 2.62 | 6.6 | 5.38 | 12.4 | 19.4 |
| Serum protein | 0.36 | 0.61 | 0.51 | 0.66 | 1.8 | 2.8 |
| Lactose | 2.57 | 4.82 | 1.87 | 1.67 | 0.53 | 0.80 |
| Ash | N/A | 0.75 | 0.88 | 0.74 | 1.4 | 2.2 |
| Fat | 45 | 0.05 | 0.15 | 9.2 | 25.4 | 39.7 |

At step 530, skim milk may be subjected to MF and optionally DF. The membranes used in step 530 may be ceramic or polymeric and may have a pore size ranging from about 0.05 μm to 0.5 μm although a ceramic membrane with a pore size of about 0.1 μm may be preferred. Variations in the membrane material and the membrane pore size alter the level of transmission of serum protein through the membrane. A larger pore size ceramic membrane has a much greater serum protein transmission compared to a smaller pore size polymeric membrane. Step 530 may proceed according to a batch or continuous process. When used as a batch process, step 530 may reduce the final concentrated volume of the skim milk to about 50 down to about 25 percent of the original volume of the skim milk, or preferably about 33 percent of the original volume. Using a continuous process, the ratio of flow rate of permeate vs. retentate may be controlled and may range from about 1 to 3, and in some preferred implementations the ratio may be 2. An exemplary MF/DF retentate composition using three cycles of MF/DF in a batch process using 0.1 μm ceramic membrane is presented in Table 1 (MFR). Additionally, the volume of water used in DF also affects the recovery of serum protein, resulting in different concentrations of serum protein in the permeate. For instance, the serum protein concentration in a MF retentate after a three cycles of MF/DF can range from about 0.2 to 2.0 wt %. Step 530 may be conducted at temperatures at about 120° F. to about 130° F.

At step 540, cream may be added back to the MF retentate and the blend subjected to UF and optionally DF. For instance, cream may be added to reach a blend with a fat-to-casein-protein ratio of 1.71 and the blend may be concentrated using a UF process. For instance, UF may use a membrane molecular weight cut-off around 10 k Dalton. The composition of an exemplary blend of cream/MF retentate composition is presented in Table 1 (MFR/Cream Blend). Step 540 may be conducted at 120° F. to 130° F. or at 40 to 50° F. The UF retentate may have a total solids content of about 40 wt %. An exemplary composition of a UF/DF retentate is presented in Table 1 (UFR). DF may be used to reduce lactose content.

At step 550, the UF retentate may be transferred to a blender or blending tank where salt and/or acid (e.g., lactic acid) may be added.

Acidification of the UF retentate, for instance in step 550, may provide a controlled approach to production of a food product (e.g., cheese or cheese base) compared to using cultures, which can provide variability depending on the culture strain(s) used. Particularly, use of direct acidification through the addition of acid may eliminate the need for culture strains and therefore the ending food product may be free of culture(s). This may prevent the accumulation of galactose, which can occur with some culture strains; and which, in turn, may promote Maillard browning. Particularly, galactose has more potential as a reducing sugar than lactose to promote such a reaction (Zehren & Nusbaum, Process Cheese pages 157 & 270). Acid addition after UF additionally preserves all of the acid in the food product as opposed to acid loss in permeate during filtration. Acidification after MF/DF prevents the aggregation of serum protein with divalent cations, such as calcium, in the MF permeate. If lactic acid is added before MF/DF, in contrast, calcium and phosphorous, released from casein micelle due to the pH reduction, can pass through MF membrane and accumulate in the permeate. Acidification after MF/DF thus results in more dairy minerals being retained in the retentate stream. Further, acidification after MF and UF avoids localized coagulation of casein in the MF and UF retentate streams and the subsequent precipitation of this coagulated casein on the membrane surfaces. Otherwise, precipitation of casein on the membrane surfaces causes reduced membrane performance and makes it more difficult to clean the membranes.

Other food grade acids such as phosphoric acid or monosodium phosphate may be used to acidify the UF retentate in step 550. For instance, adding monosodium phosphate prior to lactic acid addition may stabilize the mixture prior to evaporation and may thus prevent the composition from curdling and may eliminate the need for a homogenization step.

At step 560, the composition may be subjected to shear to reach equilibrium through homogenization, for instance, using a shear pump. Shearing breaks apart fat globules and distributes fat throughout the dairy system to provide smoothness and increased viscosity to the composition.

Optional evaporation step 570 may remove moisture and raise the total solids content, for instance, to about 65 wt % total solids. In certain implementations, the addition of salt and acid may enable the evaporation step 570 to reach a higher solids level in the product exiting an evaporator. Because a portion of the whey proteins are removed during MF of the skim milk, the UF retentate may be subjected to the evaporation step 570 at higher temperatures, for instance, to increase the solids content of the final product at a higher rate, or to feed the UF retentate at a faster rate to achieve the same percent solids in the final product to thereby produce more final product per unit of time. Particularly, whey protein is more heat sensitive compared to casein, and when higher levels of whey protein are present (e.g., when skim milk is not subjected to MF), the risk of denaturation of the whey protein and subsequent cross-linking of the whey protein to yield a non-meltable product is elevated when evaporation is conducted at higher temperatures. Because the ratio of casein is relatively higher in the protein fraction of the UF retentate, and because casein is more heat stable and does not cross-link in the same manner as whey protein, more of the UF protein content remains intact at elevated temperatures enabling a higher solids content or increased production level.

Following step 560 or optionally evaporation step 570, the composition may be further processed, for instance, by sending the composition to a filling station 170, a barrel filling system 180, a cooker 220 and/or a filler 230. In addition or alternatively, optional additives such as cultures, enzymes and/or emulsifiers may be added to the composition.

The food product produced after UF, or after the optional evaporation in step 570, may contain a total solids content of about 45 to 80 wt %, preferably about 62 to 67 wt % and most preferably about 65 wt %. On a dry basis, fat in the food product may be present at about 25 to 65 wt %, preferably at about 50 to 56 wt % and most preferably about 53 wt %. Serum protein present in the food product may be about 0.9 to 6.0 wt %, preferably about 1.5 to 2.0 wt %, and more preferably about 1.60 to 1.80 wt %.

The steps described in systems and methods 100-500 may proceed in any order or combination. For instance, the addition of lactic acid in step 550 may follow the evaporation step 570. Addition of lactic acid following evaporation may modify the texture of the food product, and particularly may yield a softer material for use in later production steps.

The steps described in systems and methods 100-500 may additionally be divided into sub steps or only portions of steps may be performed. For instance, adding lactic acid before salt in step 550, prior to evaporation in step 570, or with no salt at all prior to evaporation, may accelerate moisture loss by the casein through the evaporation process. When no salt is added in step 550, less lactic acid may be used in the process than if salt had been added as protein may be less solvated with moisture where the salt is not present, thereby avoiding hydration of the protein with moisture and subsequent shielding of the protein from the hydrogen ions present from the acid source.

Moreover, the steps described in systems and methods 100-500 may be repeated. For instance, one or more MF steps 530 may proceed under temperature conditions of 120° F. to 130° F. as described to remove whey (serum proteins) and another MF step 530 may proceed using colder temperatures such as about 40° F. to 60° F. These secondary MF in step 530 may precede combining cream with the MF retentate in the UF step 540. In addition to performing MF at cold temperatures, the MF retentate initially formed may be stored at lower temperatures, e.g., at about 40° F., for a period of time such as about twelve or more hours prior to cold temperature MF. During cold temperature storage, beta casein may dissociate from the casein micelle and subsequent cold temperature MF, e.g., at about 40° F. to 60° F., may result in the MF permeate containing the dissociated beta casein. For instance, a polymeric MF membrane with a pore size 0.5 μm may result in the MF permeate containing the beta casein. The beta casein in the secondary MF permeate may be relatively pure because the initial MF results in removal of the serum proteins, i.e., the initial permeate contains permeable proteins. As a result, the secondary permeate containing primarily beta casein may be heated up and then combined with a different stream of skim or MF retentate or used as diafiltration medium to process MF/DF under temperature conditions of 120° F. to 130° F., thus having the effect of altering the beta casein fraction in the total casein of the MF/DF retentate and finished concentrate.

Further, the steps described in systems and methods 100-500 may include additional steps. For instance, the UF retentate may optionally be constantly circulated in a step 545 following step 540. Constant circulation of the UF retentate with added salt, before or after the addition of lactic acid and other additives (e.g., water, fat, protein (e.g., MF retentate), starch, gums, flavorings), may prevent the UF retentate from gelation. In particular, UF retentate in its native state is prone to a phenomenon known as age gelation due to a relatively high concentration of micellar casein. In age gelation, micellar casein disassociates from the casein micelle upon the nucleation of calcium phosphate within the system. Calcium phosphate nucleation will occur over time as it is less stable thermodynamically in the native casein micelle. Casein disassociation from the micelle leads to cross-linking between the casein sub-particles and calcium phosphate complexes, causing gel formation to occur within the system (Van Dijk, H. J. M., *The properties of casein micelles-Changes in the state of the micellar calcium phosphate and their effects on other changes in the casein micelles,* 44 Netherlands Milk and Dairy Journal, 125-141 (1990)). This reaction is further catalyzed by higher temperatures. It has been discovered that constant circulation of the UF retentate with about 1 wt % added salt prevents age gelation and allows the UF retentate to maintain a viscosity at or below about 1000 cP for at least 8 hours and up to 48 hours. By providing a UF retentate adapted to maintain a low viscosity, food products formed of the UF retentate may be stored in an environment prior to being transferred for use in final production steps. This allows the UF retentate to be maintained in its native, non-homogenized state or substantially native state (e.g., with one or more additives) for at least about 8 and up to about 48 hours until the UF retentate is used in final production steps such, as but not limited to, mixing, cooking, homogenization, entering a stuffer, or filling (e.g., barrel filling).

Constant circulation of the UF retentate in step 545 to maintain a viscosity at or below about 1000 cP may involve using one or more of pumping or sweeping as described further in connection with Example 1. Pumping is generally by use of a positive displacement pump that circulates the UF retentate. Sweeping may involve the use of a spindle or other device in a vessel that runs at a low speed (e.g., 2 to 10 rpms) to maintain slight circulation of the UF retentate. The circulation step may proceed at temperatures of about 120° F. to 160° F., preferably about 130° F. to 150° F., and more preferably at about 140° F.

Step 545 may optionally follow the step 550 such that the UF retentate is combined with one or more additives such as salt, lactic acid, water, fat, protein (MF retentate) and/or sugar in is constantly circulated to maintain the viscosity of the composition below about 1000 cP. For instance, a portion of the MF retentate produced in step 530 may be reserved so that it is not subjected to UF with the cream, and then the reserved MF retentate may be added to the UF retentate in step 550 to increase moisture and protein and constantly circulated in step 545. In a particular example, the MF retentate may contain about 10 to 12 wt % total solids, with about 75 percent of the total solids formed of protein (i.e., about 7.5 to 9 wt % of MF retentate). Thus the addition of the MF retentate to the UF retentate, increases protein and moisture.

Following the optional constant circulation step 545, the composition may be subjected to shear in step 560, such as homogenization, to reach a selected viscosity as described further in connection with Example 2.

Example 1

This example investigates whether pumping, sweeping or holding UF retentate at higher temperatures (approximately 140° F.) can inhibit age gelation for at least 48 hours.

Materials and Methods

UF retentate samples produced according to the preceding methods were salted at levels of about 1.05 wt %, 1.14 wt %, and 1.22 wt % and pasteurized (165° F. for 1 minute) in a double boiler on a stove top. An unsalted UF retentate was used as the control. The UF retentate contained 57 wt % moisture, 43 wt % solids, 14 wt % protein in the form of casein and some whey, 0.7 wt % lactose and 26.5 wt % fat. Initial moisture (CEM), water activity, pH, and viscosity readings were taken. Viscosity was measured on a Brookfield viscometer with a number 72 vane spindle set to 5 rpms. After the 48 hour hold, moisture and water activity were measured again.

Pump Study:

The UF retentate samples were then placed into 2, 1000 mL stainless steel beakers in a water bath set to 140° F. Plastic tubing attached to a positive displacement pump was then placed into the beakers and sealed with a rubber gasket to allow for circulation of the UF retentate at a high temperature with minimal moisture loss. All samples were mixed by hand with a spoon prior to viscosity testing. Viscosity and pH readings were taken at two hour increments up to 48 hours of holding time.

Viscosity Sweep:

Pasteurized UF retentate control (no salt) and salted to 1.05 wt % samples were placed in a 1000 mL beaker in a water bath set to 140° F. A number 72 vane spindle attached to a Brookfield DVT3 rheometer was then placed into the beakers and run at 5 rpms. Viscosity readings were recorded every minute for 48 hours. The beakers were sealed with a rubber gasket to prevent moisture loss.

Holding Test:

Pasteurized UF retentate samples salted to 1.05%, 1.14%, and 1.22% and a control (no salt or acid and no salt) were placed in 400 mL beakers in a water bath set to 140° F. and held for 48 hours. Viscosity and pH readings were taken at two hour increments for 48 hours. Viscosity was measured on a Brookfield viscometer with a number 72 vane spindle set to 5 rpms. All samples were mixed by hand with a spoon prior to viscosity testing.

Results

Figure 6:
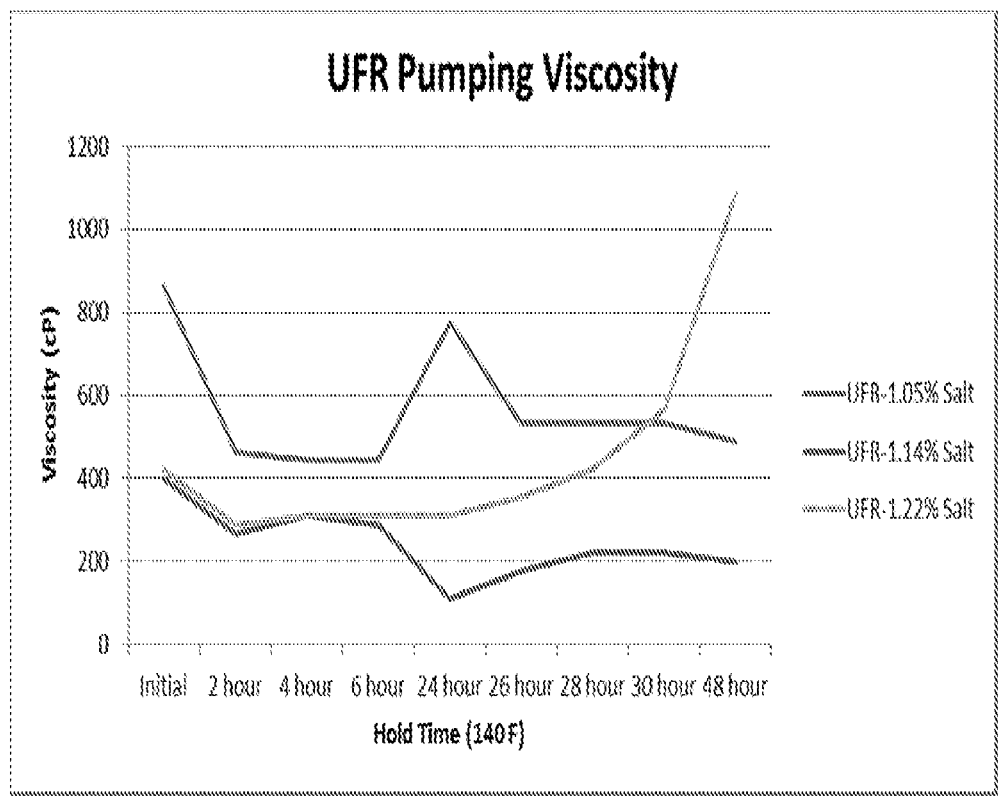
FIG. 6 is a graph illustrating UF retentate viscosity results during a pump test over 48 hours at 140° F.

Pump Study:

Viscosity results of salted UF retentate samples showed consistent readings throughout the entire 48 hour pumping cycle. The 1.22 wt % salt UF retentate sample did show some thickening at 48 hours compared to control, while the 1.05 wt % and 1.14 wt % salted UF retentate samples showed some thinning at 48 hours compared to initial (FIG. 6). However, all the viscosity readings for all three salted UF retentate samples were well within an acceptable process range of the pumping system and remained below 1000 cP. The control UF retentate (unsalted) showed consistent viscosity within the first 6 hours of holding, but had a viscosity failure (too thick to read) at the 24 hour time point.

Viscosity Sweep:

The UF retentate 1.05 wt % salt sample had consistent and stable viscosity readings throughout the first 29 hours of holding of the viscosity sweep test. A steady viscosity increase is observed after 29 hours of hold until the 37 hour time point. A steady decrease was then observed until the end time point of 48 hours. All viscosity readings throughout the entire hold time were likely within the process capabilities of a normal plant manufacturing liquid holding system as the viscosity never got above 1000 cP during the hold time.

Figure 7:
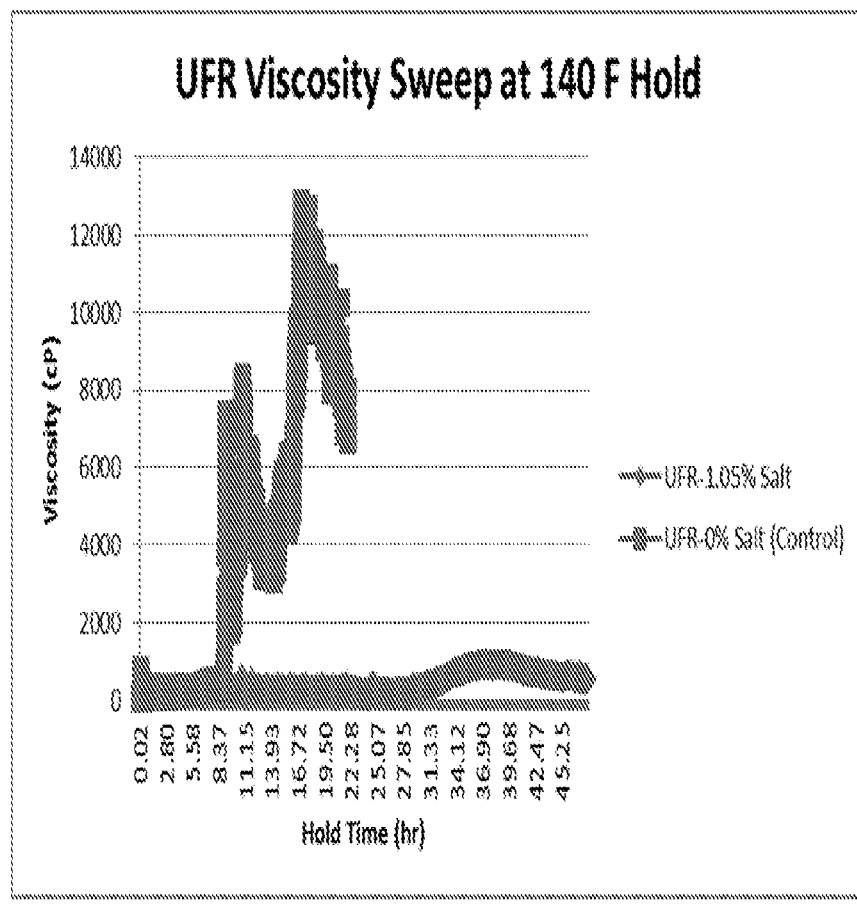
FIG. 7 is a graph illustrating UF retentate viscosity results during sweep testing over about 42 hours at 140° F.

The UF retentate unsalted (control) sample showed consistent and stable viscosity readings for the first 9 hours of hold. After this point a dramatic increase in viscosity is observed until the 18 hour time point at which a decrease is observed until the 22 hour time point. The testing was stopped at this point as there were high amounts of gelling within the sample and the viscosity was much higher than the process capabilities of a normal plant manufacturing liquid holding system. Viscosity results from both the test and control samples are illustrated in the graph of FIG. 7.

Holding Test:

The UF retentate samples used in the holding test showed a higher degree of viscosity increase compared to the samples used in the pumping test. The salted UF retentate samples remained stable for the first 6 hours of holding, and had similar viscosity readings to the same samples within the pumping test. However, a dramatic increase in viscosity was observed after 12 hours and viscosity increased above 1000 cP at 24 hours for the 1.05 wt % and 1.14 wt % salt samples. The 1.22 wt % salt sample had a much lower increase and was within the viscosity range of the results from the pumping study. Large precipitated particles were also observed within these samples at this time point, most notably in the 1.05 wt % and 1.14 wt % salt samples. The viscosity remained stable for the next 6 hours of hold after 24 hours for the 1.05 wt % and 1.14 wt % salt samples while the 1.22 wt % salt sample had a decrease in viscosity and returned to similar levels observed within the first 6 hours of hold. However, failure was found for all salt samples at the 48 hour mark. The unsalted control UF retentate sample without lactic acid remained stable for the first 6 hours of hold, but had a failure at 24 hours.

Conclusions

The results of Example 1 show that in general, the addition of salt to UF retentate is needed for texture stability when holding at 140° F. for extended periods of time equal to or exceeding 8 hours. Unsalted UF retentate became unstable (gelled) within 8 hours for some methods, and within 24 hours of holding at 140° F. in all test methods.

When comparing the results between the pump test and hold test, it appears as though circulation/agitation also plays a role in maintaining UF retentate texture stability. The viscosity results from the pump test were relatively consistent throughout the hold and did not exceed 1000 cP, while the hold test results showed a higher degree of thickening at 24 and 48 hour hold time points for all samples and multiple viscosities readings well above 1000 cP. The constant circulation and agitation of the UF retentate during the pump study likely kept the micellar casein well dispersed within the system, which inhibited cross-liking and casein aggregation. The viscosity results from the hold test also show thinning and/or stabilization occurring from initial to 6 hour hold time and from 24 hour to 30 hour hold time. It is likely that repeated hand mixing prior to viscosity testing during these time periods dispersed the casein within the system enough to inhibit or slow casein aggregation through dispersion and thus prevented thickening. Since there was no agitation in the samples for 18 hours prior to the 24 and 48 hour time points during the hold test, this is also the likely cause for the large viscosity increases observed at these time points as casein cross-linking and aggregation was unimpeded by agitation or dispersion. A similar phenomenon also likely occurred in the viscosity sweep test, as the vane spindle was constantly turning during the hold time and thus providing some agitation and dispersion within the sample.

There were no direct trends found between salt content in UF retentate and viscosity between the pumping and hold testing methods. However, the 1.14 wt % salt UF retentate sample in the pump test used a pump with a higher flow rate than the 1.05 wt % and 1.22 wt % samples. The 1.14 wt % salt sample was pumped at a rate of 16 mL/s while the 1.05 wt % and 1.22 wt % samples were pumped at a rate of 10.8 mL/s. Therefore, the samples were not all subjected to the exact same treatments and may have shown different results had the same type of pump been used for all three variables. It is interesting to note that the 1.22 wt % salt UF retentate was lower in viscosity throughout most of the hold time for both test methods than the 1.05 wt % salt UF retentate and lower in viscosity than the 1.14 wt % in the hold test. The 1.14 wt % salt UF retentate was also thinner than the 1.05 wt % in both test methods for most of the hold time. It is possible that had the 1.14 wt % salt UF retentate sample used the same type of pump as the other variables, it would have shown that lower salt content in the UF retentate equates to higher viscosity and vice versa.

Example 2

This example investigates the effects of homogenization on the viscosity of UF retentate dairy bases having differing moisture, fat and protein levels.

Materials, Methods and Results

UF retentate samples produced according to the preceding methods contained the moisture, fat, and protein values as listed in Table 2. The content of UF retentate used in the formula is also provided in Table 2. Viscosity readings were recorded after processing while at high temperatures (approximately 140° F.) and again after cooling to refrigeration temperatures (approximately 38-40° F.). The results of the viscosity testing are listed in Table 2.

TABLE 2

Composition targets and viscosity results of UF retentate dairy base

| Moisture wt % | Fat wt % | Protein wt % | UF retentate wt % | Hot Viscosity (cP) (140° F.) | Cold Viscosity (cP) (40° F.) |
| --- | --- | --- | --- | --- | --- |
| 70% | 15% | 10.5% | 55% | 0 | 2800 |
| 65% | 16% | 13.0% | 59% | 3020 | 66,800 |
| 60% | 18% | 15.0% | 68% | 20520 | 128,000 |
| 55% | 17% | 11.0% | 64% | 101,480 | 601,000 |

Conclusions

The hot and cold viscosity results of the various homogenized UF retentate dairy bases suggest that homogenization can be used to target a broad range of end product textures in both hot and cold applications. Without homogenization, the UF retentate would otherwise be grainy and have no body. The moisture, fat and protein compositional targets for the UF retentate dairy base as well as the wt % UF retentate within the dairy base contribute to the end product viscosity.

In further exemplary embodiments, a method of forming cheese or cheese base products involves separation of whole milk into cream and fluid skim followed by MF of the fluid skim to form a MF retentate with serum protein permeate removed. Cream is added to the MF retentate, and the cream and MF retentate are subjected to UF to form a UF retentate with moisture removed. Acidification of the UF retentate may result in the cheese/cheese base product.

In some exemplary embodiments, the fluid skim, MF retentate, or UF retentate is subjected to DF to remove lactose.

In addition or alternatively, the whole milk may be separated into fluid skim and cream by a centrifuge.

In addition or alternatively, the UF retentate may be processed to adjust pH by the addition of one or more acids, such as an edible acid. Edible acids may include lactic acid and citric acid.

In addition or alternatively, the UF retentate may be mixed with cheese making components such as salt, dairy powders, milk fat, enzymes, and cultures. One or more of these components may be added to the UF retentate in a blending tank, a shear pump, and/or a blender. In some implementations, mixture of the salt and acid may be in one or more blending tanks. In some implementations, homogenization of the mixture may be via the shear pump. In some implementations, cultures, enzymes, dairy powders, milk fat and water may be added prior to or during addition of the UF retentate to a blender.

In addition or alternatively, the UF retentate may be processed through evaporation to adjust moisture content. Evaporation may be conducted using a wiped film evaporator (e.g., turba fan evaporator), a thin film evaporator, a scraped surface heat exchanger, and so on. In some implementations a wiped film evaporator may be preferred.

In addition or alternatively, the UF retentate or a mixture of the UF retentate and one or more cheese components may be cooked in a cheese cooker.

In addition or alternatively, the UF retentate, a mixture of the UF retentate, and/or a cooked mixture may be provided to a stuffer, to a filler, to a metal detector, or to another system for production and packaging of cheese.

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations should not be construed as limiting.

Similarly, it should be appreciated that in the foregoing description of example embodiments, various features are sometimes grouped together in a single embodiment, figure, or description thereof for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

While the present disclosure has been particularly shown and described with reference to embodiments thereof, it will be understood by those skilled in the art that various other changes in the form and details may be made without departing from the spirit and scope of the disclosure.

What is claimed is:

1. A method for the production of a food product, the method comprising the steps of:
    subjecting a combination of cream and skim milk microfiltration retentate to ultrafiltration to remove moisture and increase total solids, wherein the cream and the skim milk microfiltration retentate are non-acidified such that the ultrafiltration forms a non-acidified ultrafiltration retentate;
    acidifying the non-acidified ultrafiltration retentate to form an acidified ultrafiltration retentate; and
    adding the acidified ultrafiltration retentate to a wiped film evaporator to adjust a moisture content of the acidified ultrafiltration retentate and form the food product.

2. The method of claim 1, wherein prior to the step of adding the acidified ultrafiltration retentate to the wiped film evaporator, further comprising a step of homogenizing the acidified ultrafiltration retentate with a shear pump.

3. The method of claim 1, wherein the food product is blended with at least one additive selected from the group consisting of: dairy powders, milk fat, bacterial cultures, emulsifiers, and water.

4. The method of claim 1, wherein the cream is derived from a same volume of whole milk from which the skim milk microfiltration retentate is derived.

5. The method of claim 1, wherein the food product comprises a natural cheese, a process cheese or an enzyme modified cheese.

6. The method of claim 1, wherein prior to the step of subjecting the combination of cream and skim milk microfiltration retentate to ultrafiltration, further comprising a step of subjecting the skim milk microfiltration retentate to diafiltration.

7. The method of claim 1, wherein after the step of subjecting the combination of cream and skim milk microfiltration retentate to ultrafiltration, further comprising a step of subjecting the combination of cream and skim milk microfiltration retentate to diafiltration.

8. The method of claim 1, wherein ultrafiltration is performed using a membrane molecular weight cut-off of about 10 kilodalton.

9. The method of claim 1, further comprising blending one or more of a salt, an acid, or a culture with the non-acidified ultrafiltration retentate.

10. The method of claim 1, wherein the food product contains a total solids content of about 45 to about 80 wt %.

11. The method of claim 1, wherein the food product contains a fat content of about 25 to about 65 wt % on a dry basis.

12. The method of claim 1, wherein the food product contains a serum protein content of about 0.9 to about 6 wt %.

13. The method of claim 1, wherein the non-acidified ultrafiltration retentate is constantly circulated to prevent gelation.

14. The method of claim 13, wherein as the non-acidified ultrafiltration retentate is constantly circulated, further comprising a step of adding one or more additives selected from the group consisting of: salt, water, fat, protein, and sugar.

15. The method of claim 1, further comprising the steps of:
    reserving a portion of the microfiltration retentate from ultrafiltration; and
    adding the reserved portion to the non-acidified ultrafiltration retentate.

16. The method of claim 15, wherein the reserved portion of the microfiltration retentate contains a total solids content of about 10 to about 12 wt %.

17. The method of claim 1, further comprising a step of cooking the food product.

18. The method of claim 1, wherein prior to the step of subjecting the combination of cream and skim milk microfiltration retentate to ultrafiltration, further comprising a step of subjecting a volume of fluid skim milk from which the skim milk microfiltration retentate is derived to diafiltration.

19. The method of claim 1, wherein prior to the step of subjecting the combination of cream and skim milk microfiltration retentate to ultrafiltration, further comprising a step of cooling the microfiltration retentate to a temperature of about 40° F. to about 60° F.

* * * * *